(12) United States Patent
Heo et al.

(10) Patent No.: US 11,447,171 B2
(45) Date of Patent: Sep. 20, 2022

(54) STEERING DEVICE OF VEHICLE

(71) Applicant: MANDO Corporation, Pyeongtaek (KR)

(72) Inventors: Seong Moo Heo, Yongin (KR); Won Pyo Gong, Seoul (KR)

( * ) Notice: Subject to any disclaimer, the term of this patent is extended or adjusted under 35 U.S.C. 154(b) by 0 days.

(21) Appl. No.: 17/338,649

(22) Filed: Jun. 3, 2021

(65) Prior Publication Data
US 2021/0380159 A1 Dec. 9, 2021

(30) Foreign Application Priority Data

Jun. 9, 2020 (KR) ........................ 10-2020-0069347

(51) Int. Cl.
| | |
|---|---|
| *B62D 3/08* | (2006.01) |
| *F16C 25/08* | (2006.01) |
| *B62D 5/04* | (2006.01) |
| *F16H 25/20* | (2006.01) |

(52) U.S. Cl.
CPC ............ *B62D 3/08* (2013.01); *B62D 5/0448* (2013.01); *F16C 25/083* (2013.01); *F16H 25/2006* (2013.01); *F16H 2025/2096* (2013.01)

(58) Field of Classification Search
CPC ..... B62D 3/008; B62D 5/0448; F16C 25/083; F16H 25/2209; F16H 25/2006; F16H 2025/2096

USPC ....................................................... 74/424.72
See application file for complete search history.

(56) References Cited

U.S. PATENT DOCUMENTS

| | | | | | |
|---|---|---|---|---|---|
| 2,978,920 | A | * | 4/1961 | Sears et al. ............. | B23Q 5/56 74/441 |
| 2,982,145 | A | * | 5/1961 | Orner .................. | F16H 25/2418 74/89.4 |
| 5,501,118 | A | * | 3/1996 | Benton ............... | F16H 25/2209 74/89.42 |
| 7,562,596 | B2 | * | 7/2009 | Chen .................... | F16H 25/2209 74/89.42 |
| 10,794,682 | B2 | * | 10/2020 | Chen ...................... | G01B 21/22 |
| 2014/0345966 | A1 | * | 11/2014 | Asakura ................ | F16C 35/067 180/444 |
| 2018/0127019 | A1 | * | 5/2018 | Yamaguchi .......... | B62D 5/0424 |
| 2018/0292294 | A1 | * | 10/2018 | Yamada ............... | B62D 5/0427 |

FOREIGN PATENT DOCUMENTS

| | | | | |
|---|---|---|---|---|
| DE | 102006037339 A1 | * | 2/2008 | ......... F16H 25/2209 |
| KR | 20170088167 A | * | 8/2017 | ........... B62D 5/0448 |

* cited by examiner

*Primary Examiner* — Jake Cook
(74) *Attorney, Agent, or Firm* — Harvest IP Law, LLP

(57) ABSTRACT

According to the embodiments, it is possible to mitigate noise by compensating for the clearance inside the bearing supporting the rotation of the ball nut and the clearance between the ball nut and the ball screw and prevent excessive friction between the ball nut and the ball screw and inside the bearing to thereby allow the driver a better steering feel.

20 Claims, 11 Drawing Sheets

STEERING DEVICE OF VEHICLE

CROSS-REFERENCE TO RELATED APPLICATION

This application claims priority from Korean Patent Application No. 10-2020-0069347, filed on Jun. 9, 2020, which is hereby incorporated by reference for all purposes as if fully set forth herein.

BACKGROUND

Field

Embodiments of the disclosure relate to a steering device of a vehicle and, more specifically, to a steering device of a vehicle that may mitigate noise by compensating for a clearance inside a bearing supporting the rotation of a ball nut and a clearance between the ball nut and a ball screw and allow a driver a better steering feel by preventing excessive friction between the ball nut and the ball screw and inside the bearing.

Description of Related Art

The rack-driven power assist steering system or steer-by-wire steering system includes a ball screw having two opposite ends connected with a tie rod and a knuckle arm, a ball nut coupled with the ball screw via balls, and a motor for rotating the ball nut to assist the driver in steering or steer the vehicle based on the driver's steering wheel manipulation information.

Such a steering device includes balls in the bearing supporting the rotation of the ball nut and between the ball screw and the ball nut. For assembly and rotation of the balls, a clearance inevitably exists between the balls and the screw groove or between the balls and the inner ring and outer ring and, upon driving, causes noise.

The noise deteriorates the driver's steering feeling and thus needs to be mitigated. In particular, for autonomous vehicles, noise transmitted to the driver during autonomous driving is required to be minimized.

BRIEF SUMMARY

According to embodiments, there is provided a steering device of a vehicle that may mitigate noise by compensating for a clearance inside a bearing supporting the rotation of a ball nut and a clearance between the ball nut and a ball screw and allow a driver a better steering feel by preventing excessive friction between the ball nut and the ball screw and inside the bearing.

According to an embodiment, there may be provided a steering device of a vehicle, comprising a ball nut including a first ball nut member and a second ball nut member an inner circumferential surface of each of which is coupled with a ball screw via a first ball, a nut pulley coupled to an outer circumferential surface of the first ball nut member, and a step jaw protruding from an outer circumferential surface of the second ball nut member, a bearing including an inner ring including a first inner ring coupled to the outer circumferential surface of the first ball nut member and a second inner ring coupled to the outer circumferential surface of the second ball nut member and provided between the nut pulley and the step jaw, an outer ring coupled to a housing, a second ball provided between the first inner ring and the outer ring, and a third ball provided between the second inner ring and the outer ring, a first elastic member provided between the nut pulley and the first inner ring, and a second elastic member provided between the step jaw and the second inner ring.

According to the embodiments, it is possible to mitigate noise by compensating for the clearance inside the bearing supporting the rotation of the ball nut and the clearance between the ball nut and the ball screw and prevent excessive friction between the ball nut and the ball screw and inside the bearing to thereby allow the driver a better steering feel.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
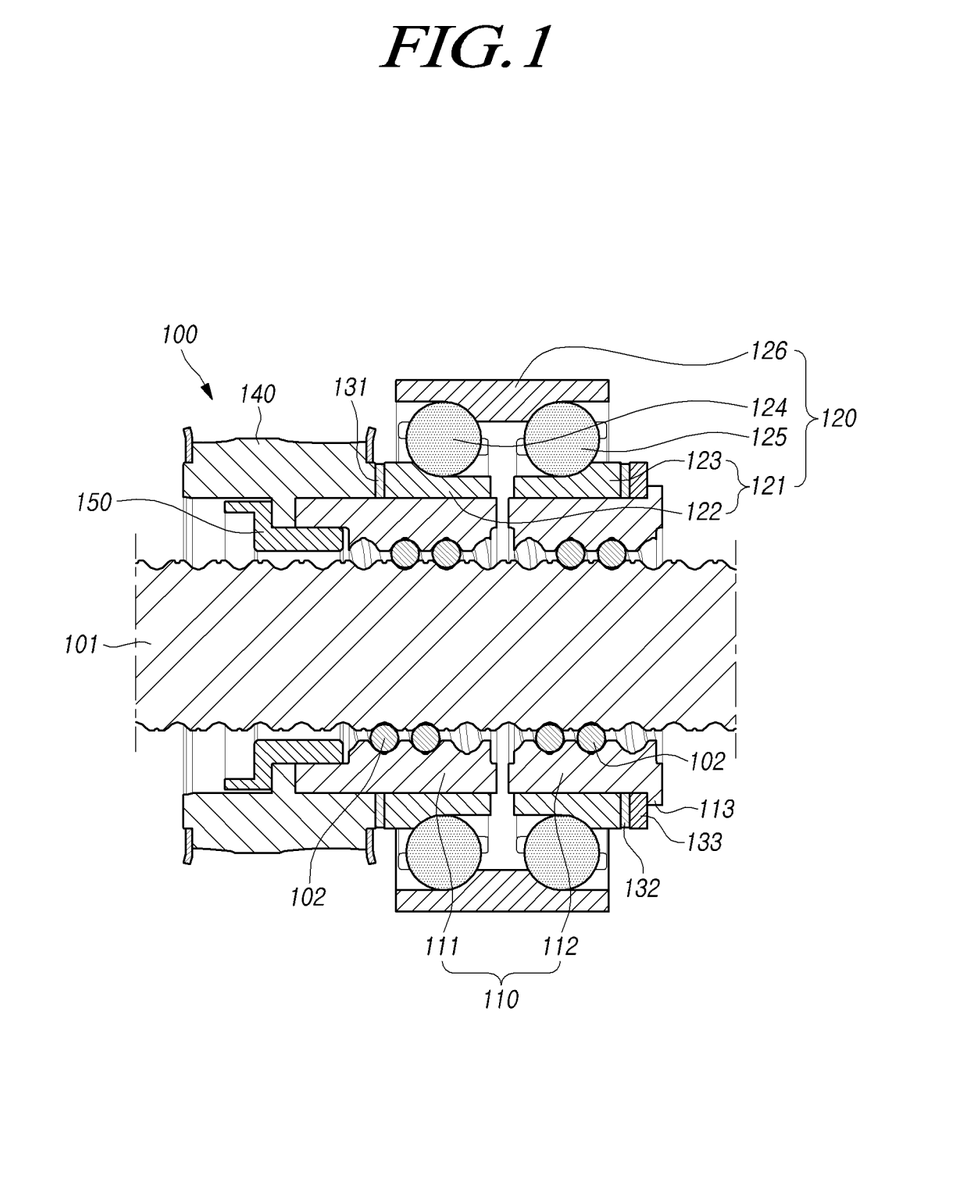
FIG. 1 is a cross-sectional view illustrating a steering device of a vehicle according to an embodiment.
Figure 2:
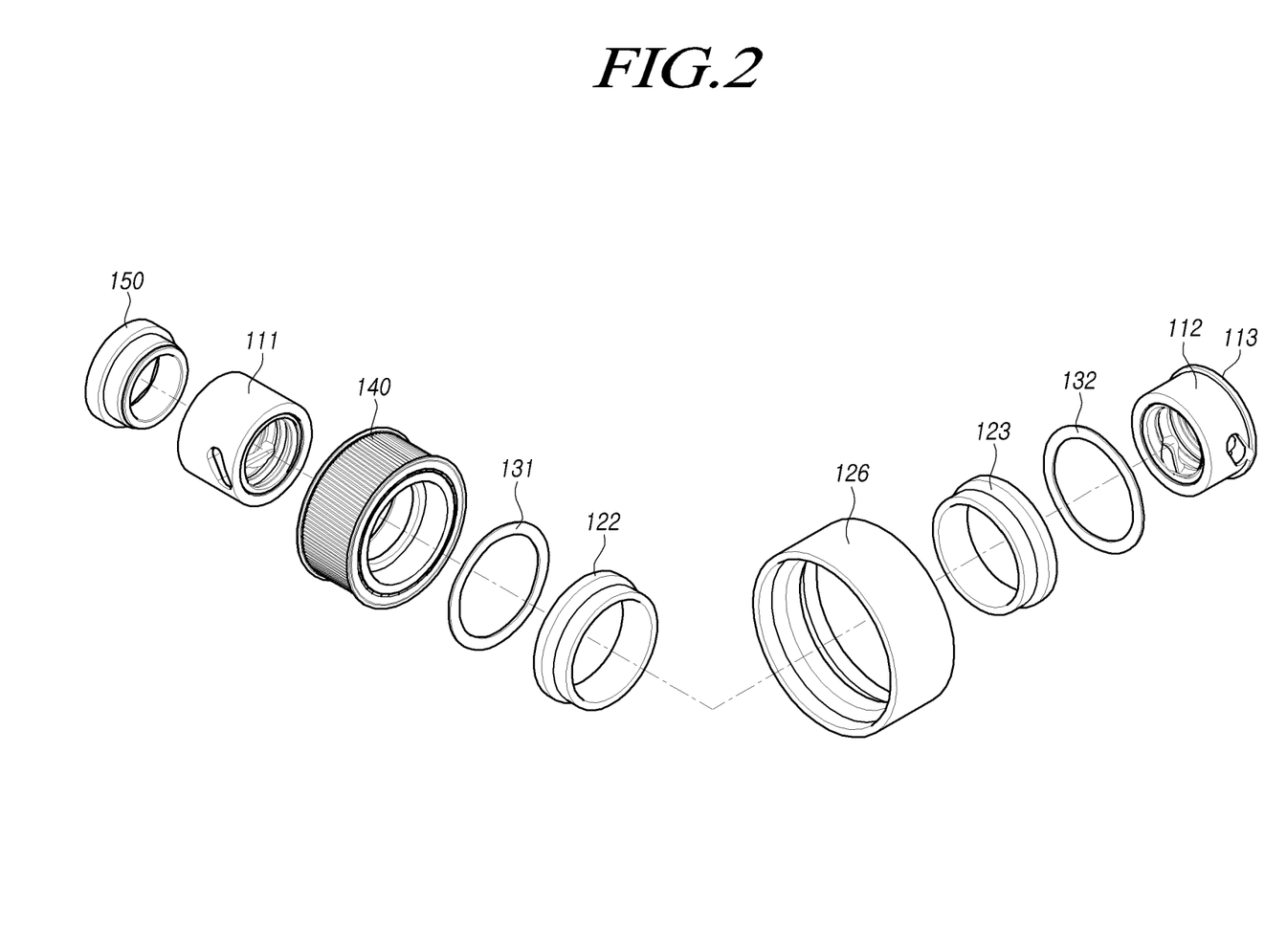
FIG. 2 is an exploded perspective view illustrating a portion of FIG. 1.
Figure 3:
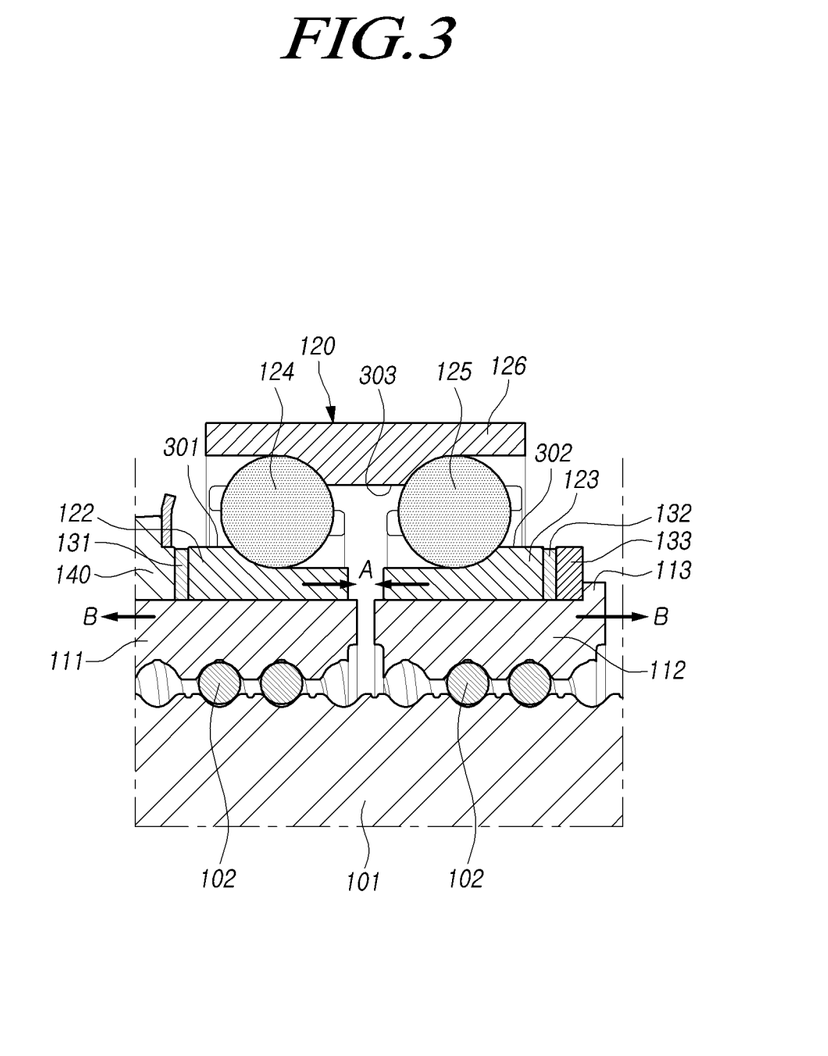
FIGS. 3 and 4 are enlarged views illustrating a portion of FIG. 1.
Figure 4:
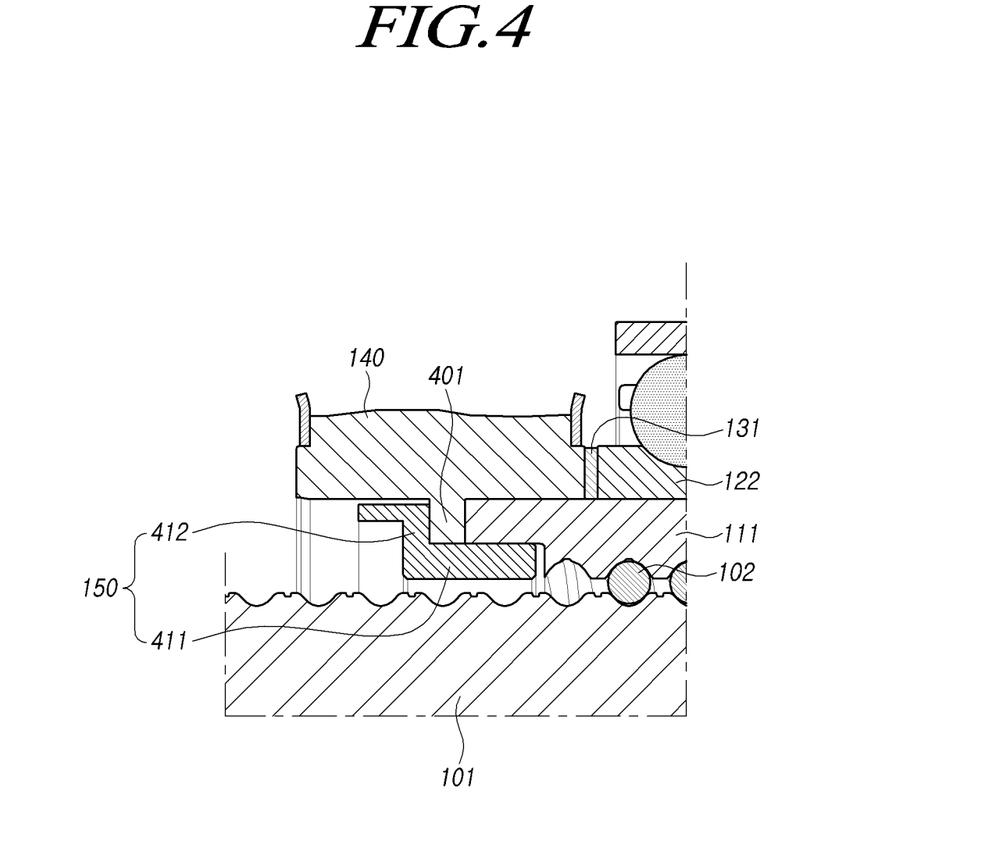
Figure 5:
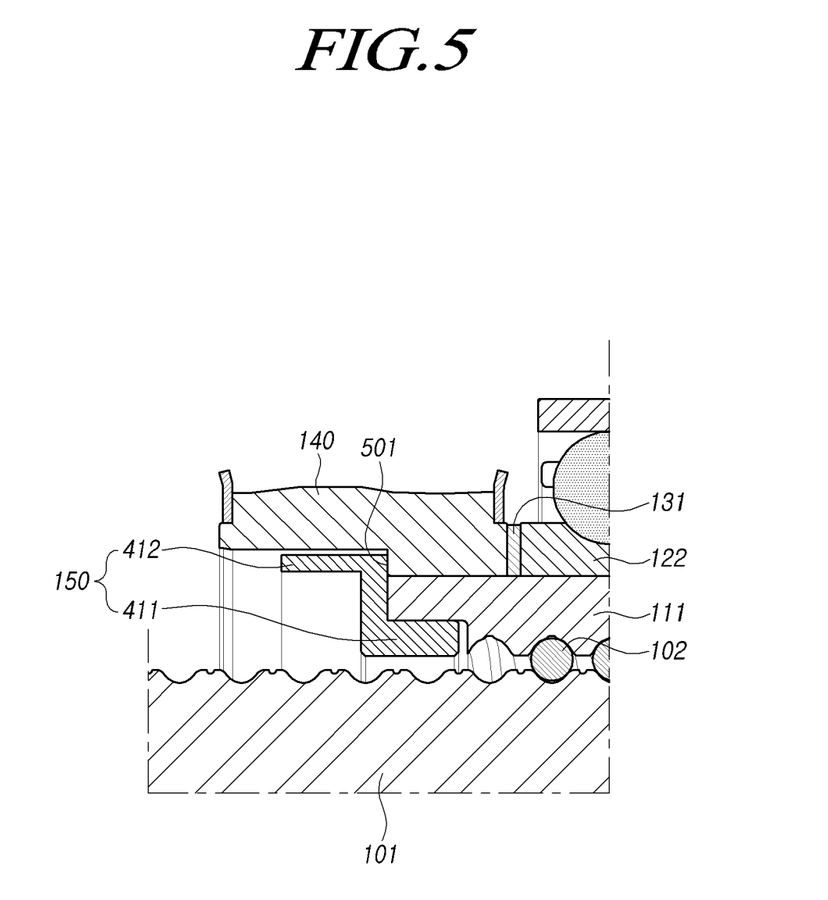
FIG. 5 is a cross-sectional view illustrating a portion of a steering device of a vehicle according to an embodiment.
Figure 6:
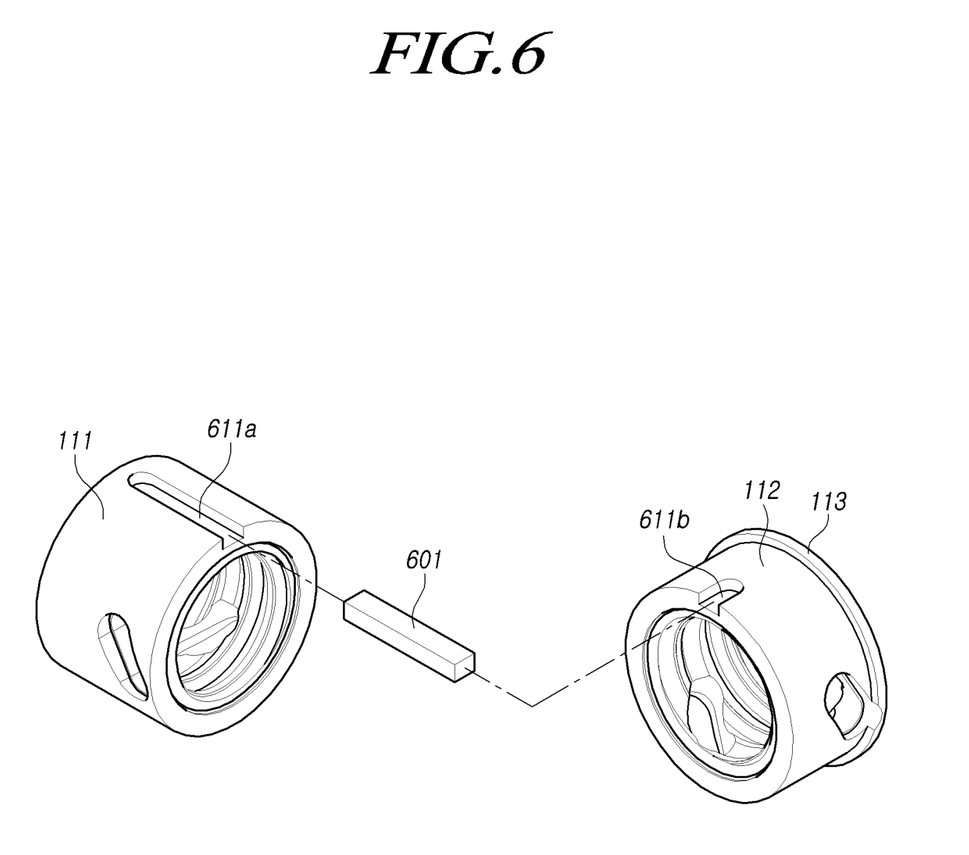
FIGS. 6, 7, and 8 are exploded perspective views illustrating a portion of a steering device of a vehicle according to an embodiment.
Figure 7:
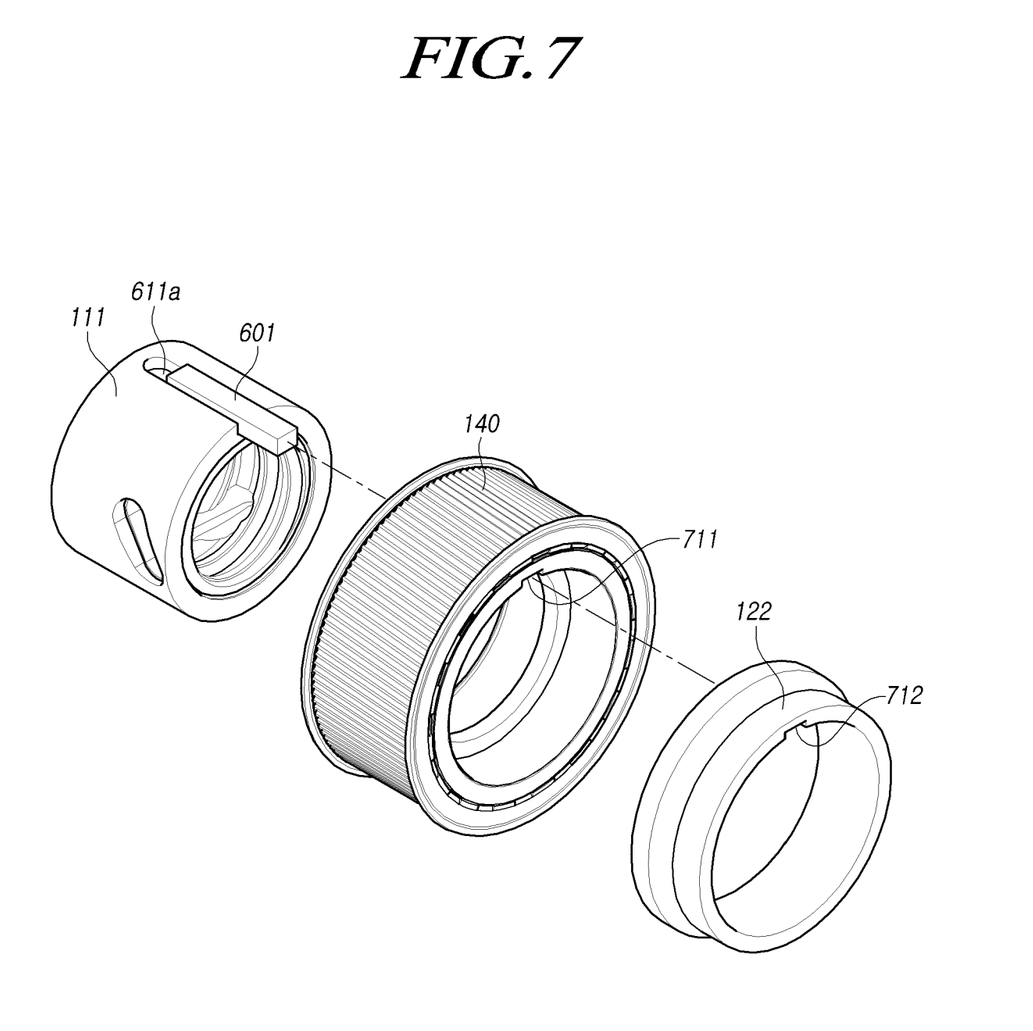
Figure 8:
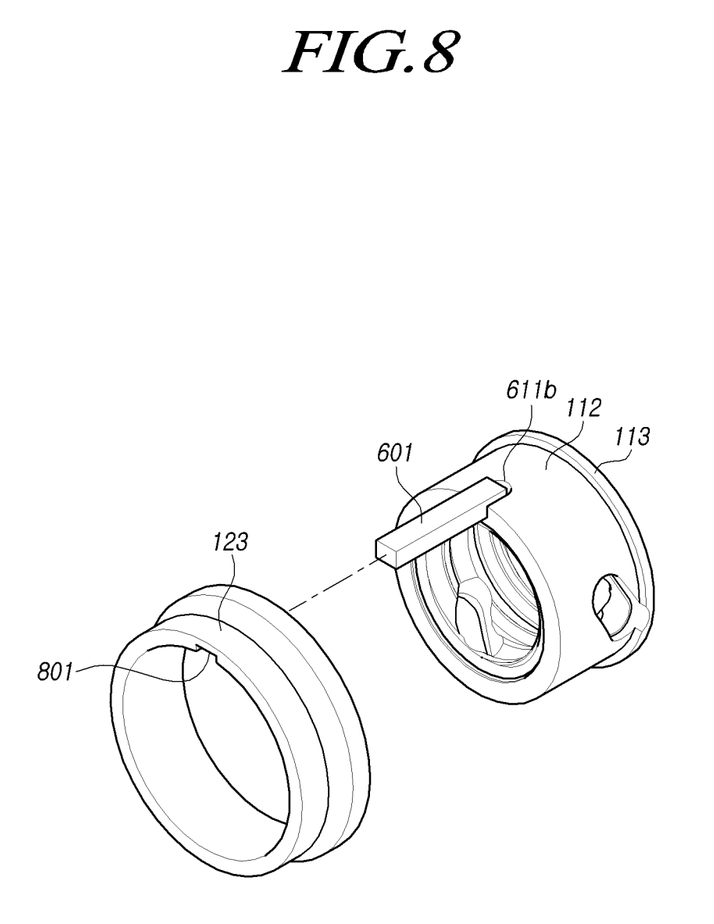
Figure 9:
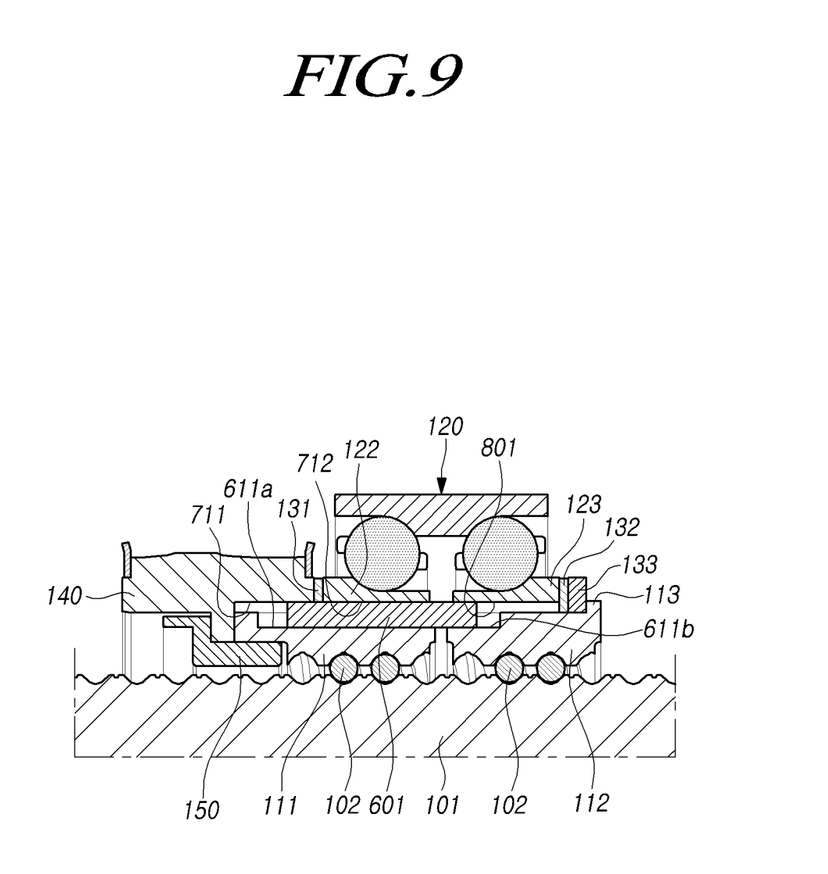
FIG. 9 is a cross-sectional view illustrating a portion of a steering device of a vehicle according to an embodiment.
Figure 10:
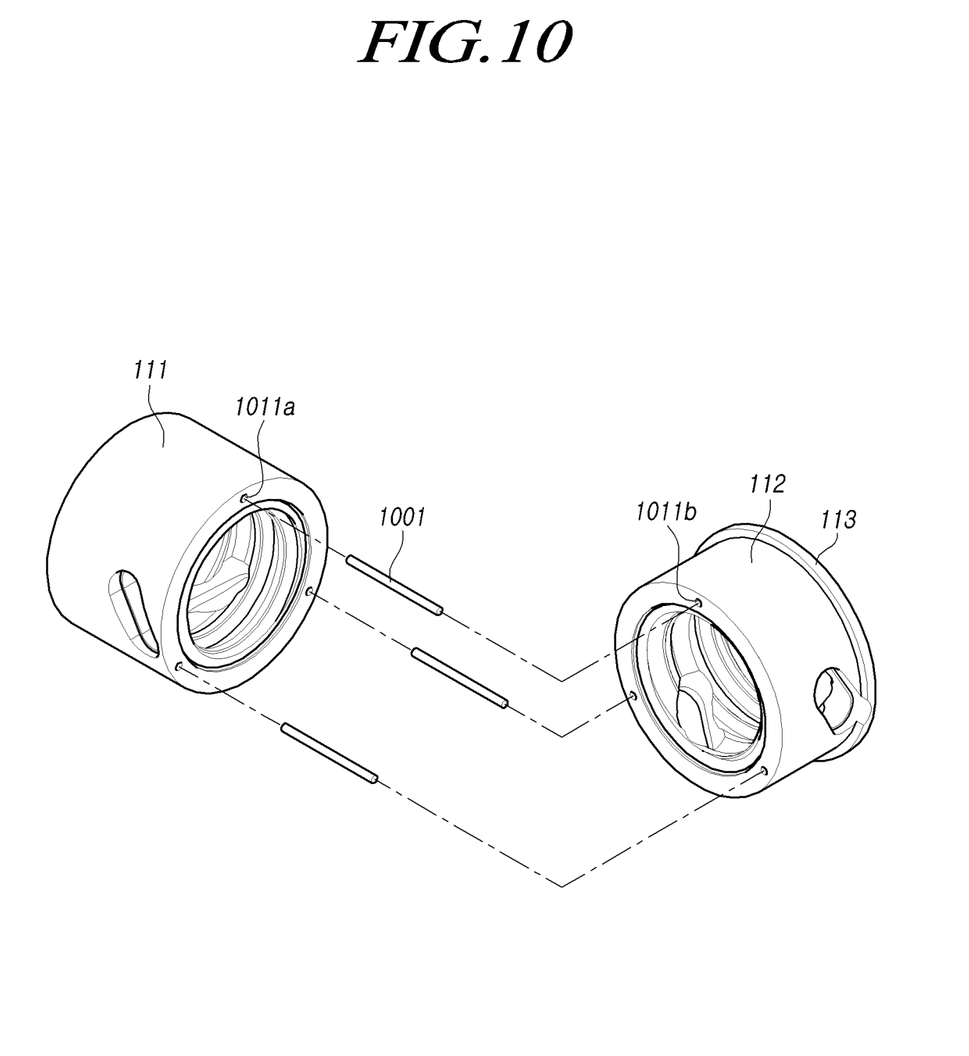
FIG. 10 is an exploded perspective view illustrating a portion of a steering device of a vehicle according to an embodiment.
Figure 11:
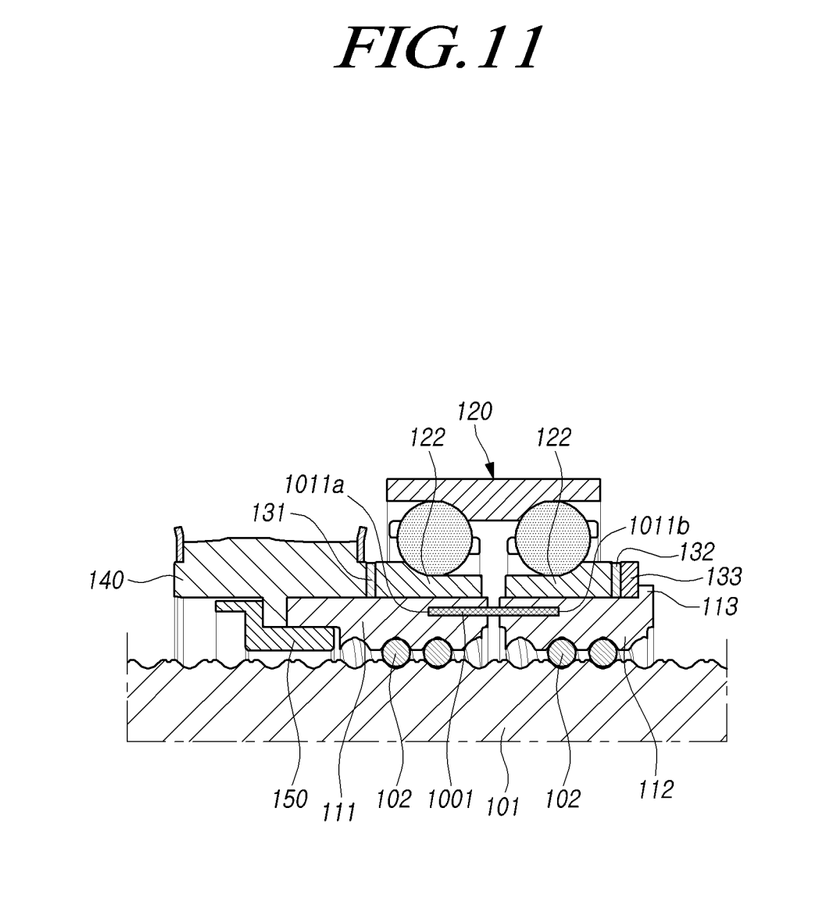
FIG. 11 is a cross-sectional view illustrating a portion of a steering device of a vehicle according to an embodiment.

FIG. 1 is a cross-sectional view illustrating a steering device of a vehicle according to an embodiment. FIG. 2 is an exploded perspective view illustrating a portion of FIG. 1. FIGS. 3 and 4 are enlarged views illustrating a portion of FIG. 1. FIG. 5 is a cross-sectional view illustrating a portion of a steering device of a vehicle according to an embodiment. FIGS. 6, 7, and 8 are exploded perspective views illustrating a portion of a steering device of a vehicle according to an embodiment. FIG. 9 is a cross-sectional view illustrating a portion of a steering device of a vehicle according to an embodiment. FIG. 10 is an exploded perspective view illustrating a portion of a steering device of a vehicle according to an embodiment. FIG. 11 is a cross-sectional view illustrating a portion of a steering device of a vehicle according to an embodiment.

According to an embodiment, a steering device 100 of a vehicle includes a ball nut 110 including a first ball nut member 111 and a second ball nut member 112 an inner circumferential surface of each of which is coupled with a ball screw 101 via a first ball, a nut pulley 140 coupled to an outer circumferential surface of the first ball nut member 111, and a step jaw 113 protruding from an outer circumferential surface of the second ball nut member 112, a bearing 120 including an inner ring 121 including a first inner ring 122 coupled to the outer circumferential surface of the first ball nut member 111 and a second inner ring 123 coupled to the outer circumferential surface of the second ball nut member 112 and provided between the nut pulley 140 and the step jaw 113, an outer ring 126 coupled to a housing, a second ball provided between the first inner ring 122 and the outer ring 126, and a third ball provided between the second inner ring 123 and the outer ring 126, a first elastic member 131 provided between the nut pulley 140 and the first inner ring 122, and a second elastic member 132 provided between the step jaw 113 and the second inner ring 123.

Referring to FIGS. 1 and 2, the ball nut 110 is coupled to the ball screw 101 via the first balls 102, and the nut pulley 140 is connected to a motor (not shown) by a belt (not shown), so that the rotational force of the motor is axially converted by the rotation of the ball nut 110 and transferred to the ball screw 101, thereby steering the wheels.

The ball nut 110 includes the first ball nut member 111 and the second ball nut member 112. A screw groove is formed in the inner circumferential surface of each of the first ball nut member 111 and the second ball nut member 112, so that the first ball nut member 111 and the second ball nut member 112 are coupled with the ball screw 101 via the first balls 102.

The nut pulley 140 is coupled onto the outer circumferential surface of the first ball nut member 111, and a step jaw 113 protrudes from the outer circumferential surface of the second ball nut member 112.

The outer ring 126 of the bearing 120 is coupled to the housing, and the inner ring 121 of the bearing 120 is coupled to the ball nut 110 between the nut pulley 140 and the step jaw 113.

The outer ring 126 of the bearing 120 may be coupled to the housing by a lock screw, and elastic members, e.g., wave washers, may further be provided on two opposite sides of the outer ring 126 in the axial direction. Such a structure in which the outer ring 126 is coupled to the housing is well known in the art, and thus, no detailed description is given below.

The inner ring 121 of the bearing 120 includes a first inner ring 122 and a second inner ring 123. The first inner ring 122 is coupled onto the outer circumferential surface of the first ball nut member 111, and the second inner ring 123 is coupled onto the outer circumferential surface of the second ball nut member 112.

As illustrated in the drawings, as the nut pulley 140 and the step jaw 113 are positioned on two opposite ends of the ball nut 110 in the axial direction, and the first inner ring 122 and the second inner ring 123 are positioned between two opposite ends of the ball nut 110 in the axial direction, the inner ring 121 is provided between the nut pulley 140 and the step jaw 113.

As second balls 124 are provided between the first inner ring 122 and the outer ring 126, and third balls 125 are provided between the second inner ring 123 and the outer ring 126, the rotation of the ball nut 110 is supported on the housing by the bearing 120.

As such, the rotation of the ball nut 110 is converted into a slide in the axial direction of the ball screw 101 by the first balls 102, and the rotation of the ball nut 110 is supported on the housing by the second balls 124 and the third balls 125. Clearances between the balls and the screw groove or between the balls and the inner ring and outer ring are inevitable for assembly and rotation of the first balls 102, second balls 124, and third balls 125.

Such clearance may cause noise. In the steering device 100 of the vehicle according to an embodiment, the ball nut 110 is separated into the first ball nut member 111 and the second ball nut member 112, and the first elastic member 131 and the second elastic member 132 are provided as described above. Thus, the clearances between the ball nut 110 and the ball screw 101 and inside the bearing 120 may be compensated, mitigating noise.

Referring to FIG. 3, the first elastic member 131 is provided between the nut pulley 140 and the first inner ring 122, and the second elastic member 132 is provided between the step jaw 113 and the second inner ring 123.

As the first elastic member 131 and the second elastic member 132, wave washers may be used, for example.

An annular insertion member 133 may be provided between the second elastic member 132 and the step jaw 113. As the insertion member 133 is provided, the step jaw 113 may be formed to have a smaller height, so that the second ball nut member 112 may easily be processed.

In other words, if the step jaw 113 is formed to have the height corresponding to the thickness of the second elastic member 132 so as to be fully supported on one side surface of the second elastic member 132, it may be hard to process the second ball nut member 112 and save costs.

As the insertion member 133 is provided between the second elastic member 132 and the step jaw 113, the step jaw 113 may be fully supported on the second elastic member 132 although its height is reduced.

As a coupling member 150 supports the nut pulley 140 in the axial direction and is coupled to the first ball nut member 111 as described below, the first elastic member 131 and the second elastic member 132 may be compressed to exert elastic force to the first inner ring 122, the second inner ring 123, the first ball nut member 111, and the second ball nut member 112.

As illustrated in the drawings, a first locking portion 301 supported on the second ball 124 is formed on the outer circumferential surface of the first inner ring 122 to protrude from the end on the side of the nut pulley 140, and a second locking portion 302 supported on the third ball 125 is formed on the outer circumferential surface of the second inner ring 123 to protrude from the end on the side of the step jaw 113.

A third locking portion 303 supported on the second ball 124 and the third ball 125 protrudes from the inner circumferential surface of the outer ring 126. The third locking portion 303 may be provided in a middle of the outer ring 126.

Since the compressed first elastic member 131 and second elastic member 132 exert elastic forces to the first inner ring 122 and the second inner ring 123 in the directions in which they face each other (refer to reference character A), the second ball 124 comes in tight contact with the first locking portion 301 and the third locking portion 303, and the third ball 125 comes in tight contact with the second locking portion 302 and the third locking portion 303, compensating for the clearance.

In other words, the first inner ring 122 and the second inner ring 123 are provided to be axially slidable on the outer circumferential surface of the first ball nut member 111 and the outer circumferential surface of the second ball nut member 112, respectively, and the first inner ring 122 and the second inner ring 123 are pressurized towards each other by the first elastic member 131 and the second elastic member 132.

The first inner ring 122 and the second inner ring 123 are spaced apart from each other and may thus be pressurized towards each other by the first elastic member 131 and the second elastic member 132.

Since the ball nut 110 is separated into the first ball nut member 111 and the second ball nut member 112 so that the first elastic member 131 and the second elastic member 132 exert elastic force to the first ball nut member 111 and the second ball nut member 112 away from each other (refer to reference character B) by action-reaction, the first ball 102 is brought in tight contact with the screw groove of the first ball nut member 111 or the second ball nut member 112 and the screw groove of the ball screw 101, compensating for the clearance.

As illustrated in the drawings, the first ball nut member 111 and the second ball nut member 112 are spaced apart from each other by the elastic force of the first elastic member 131 and the second elastic member 132.

However, unlike the first ball nut member 111 coupled with the nut pulley 140, the rotational force of the motor is not directly transferred to the second ball nut member 112. As there is provided a supporting member 601 or 1001 supported on the first ball nut member 111 and the second ball nut member 112 in the circumferential directions as described below, the second ball nut member 112 is rotated along with the first ball nut member 111.

As such, the first balls 102 to the third balls 125 come in tight contact with the screw grooves and thus compensate for the clearance. Thus, although the ball nut 110 moves, noise may be minimized, and the driver may have a better steering feel.

Referring to FIGS. 4 and 5, the coupling member 150, which supports the nut pulley 140 towards the first inner ring 122, is coupled to the first ball nut member 111.

As the coupling member 150 is coupled to the first ball nut member 111 while supporting the nut pulley 140, the position of the nut pulley 140 with respect to the first ball nut member 111 is fixed. The first elastic member 131 is compressed between the nut pulley 140 and the first inner ring 122, and the second elastic member 132 is compressed between the second inner ring 123 and the step jaw 113.

The coupling member 150 may include a small diameter portion 411 coupled to the inner circumferential surface of the first ball nut member 111 and a large diameter portion 412 supported on the nut pulley 140.

The small diameter portion 411 may be press-fitted or screwed to the first ball nut member 111, for example.

In other words, as the small diameter portion 411 advances and fits into the first ball nut member 111, the large diameter portion 412 supports the nut pulley 140, and the first elastic member 131 and the second elastic member 132 are compressed.

If the nut pulley 140 deeply advances when the coupling member 150 fits into the first ball nut member 111, the elastic force of the first elastic member 131 and the second elastic member 132 becomes excessive, so that a large amount of friction may be caused between the ball nut 110 and the ball screw 101 or inside the bearing 120.

If the nut pulley 140 shallowly advances, the elastic force of the first elastic member 131 and the second elastic member 132 becomes insufficient, so that the clearance between the ball nut 110 and the ball screw 101 or inside the bearing 120 may insufficiently be compensated, causing noise.

Thus, a proper position needs to be set for the nut pulley 140. This may be realized by forming a protrusion 401 or a step portion 501 in the nut pulley 140.

As illustrated in FIG. 4, the protrusion 401 may be formed on the inner circumferential surface of the nut pulley 140. The protrusion 401 may be provided between the large diameter portion 412 and an end of the first ball nut member 111.

The large diameter portion 412 is supported on the first ball nut member 111 not directly but via the protrusion 401.

In other words, since the protrusion 401 is axially supported on the end of the first ball nut member 111, the nut pulley 140 may be prevented from deeply advancing.

As the small diameter portion 411 is coupled to the first ball nut member 111, the large diameter portion 412 is axially supported on the protrusion 401. Thus, the nut pulley 140 may be prevented from shallowly advancing.

As illustrated in FIG. 5, a step portion 501 may be formed on the inner circumferential surface of the nut pulley 140 as the diameter of the nut pulley 140 increases. The large diameter portion 412 may be axially supported on the step portion 501 and an end of the first ball nut member 111.

In other words, since the small diameter portion 411 is coupled to the first ball nut member 111 so that the large diameter portion 412 is axially supported on the end of the first ball nut member 111 to restrict the coupling depth, the nut pulley 140 may be prevented from deeply or shallowly advancing.

As such, it is possible to prevent nose or excessive friction between the ball nut 110 and the ball screw 101 or inside the bearing 120 by forming the protrusion 401 or the step portion 501 in the nut pulley 140 and setting the measures of the first ball nut member 111 and the coupling member 150 considering, e.g., the stiffness of the first elastic member 131 and the second elastic member 132.

As described above, there is provided the supporting member 601 or 1001 supported on the first ball nut member 111 and the second ball nut member 112 in the circumferential direction so as to allow the second ball nut member 112 to rotate along with the first ball nut member 111.

As the supporting member 601 or 1001 is provided, the rotational force of the motor, which is transferred through the nut pulley 140 to the first ball nut member 111, may be transferred to the second ball nut member 112 as well. Thus, the first ball nut member 111 and the second ball nut member 112 may be rotated integrally.

The supporting member 601 or 1001 is slidably coupled with at least one of the first ball nut member 111 or the second ball nut member 112 in the axial direction so that elastic forces may be applied to the first ball nut member 111 and the second ball nut member 112 away from each other (refer to reference character B of FIG. 3) by the first elastic member 131 and the second elastic member 132 as described above.

In other words, the supporting member 601 or 1001 may be slidably coupled in the axial direction for both the first ball nut member 111 and the second ball nut member 112 or may be slidably coupled in the axial direction for one of the first ball nut member 111 and the second ball nut member 112 while being fastened in the axial direction for the other, and by the supporting member 601 or 1001, the first ball nut member 111 and the second ball nut member 112 may be rotated integrally and, in the axial direction, may be relatively moved.

The supporting member 601 or 1001 may be coupled to one of the first ball nut member 111 and the second ball nut member 112 to be slidable in the axial direction while being integrally formed with the other.

In other words, one of the first ball nut member 111 and the second ball nut member 112 may be integrally formed with the supporting member 601 or 1001, and the other may be supported on the supporting member 601 or 1001 in the circumferential direction and coupled thereto to be slidable in the axial direction.

The embodiment in which the supporting member 601 or 1001 is integrally formed with any one of the first ball nut member 111 and the second ball nut member 112 is not illustrated in the drawings, but the shape thereof is changed from the drawings. You may guess enough.

It should be noted that when the first ball nut member 111 and the second ball nut member 112 may relatively move in the axial direction, this means that such relative motion is possible within the range of the clearance between the first balls 102 and the screw groove, but does not mean that the first ball nut member 111 and the second ball nut member 112 get close or away outside the clearance, with them coupled to the ball screw 101, nor can they get close outside the range of the clearance.

In other words, before the first ball nut member 111 and the second ball nut member 112 are coupled to the ball screw 101, relative motion in the axial direction is possible without limitations but, after the first ball nut member 111 and the second ball nut member 112 are coupled to the ball screw 101, the supporting member 601 or 1001 is supported in the circumferential direction, so that the first ball nut member 111 and the second ball nut member 112 are rotated integrally, and relative rotations are impossible, and thus, the relative motion in the axial direction is also restricted.

In other words, rotation is needed for the first ball nut member 111 and the second ball nut member 112 coupled to the ball screw 101 to move in the axial direction, but since they are integrally rotated by the supporting member 601 or 1001, the first ball nut member 111 and the second ball nut member 112 slide by the same distance in the axial direction and thus cannot get close by the clearance or more.

Thus, such an occasion does not occur where the first ball nut member 111 and the second ball nut member 112 are spaced apart from each other, and the ball nut 110 and the bearing 120 are disassembled.

The supporting member 601 or 1001 may be shaped as a bar as illustrated in FIGS. 6 to 9 or as a pin as illustrated in FIGS. 10 and 11, but is not limited thereto. For example, the supporting member 601 or 1001 may have any shape that is supported on the first ball nut member 111 and the second ball nut member 112 in the circumferential direction and coupled to be axially slidable to at least one thereof.

Referring to FIG. 6, insertion grooves 611a and 611b may be formed in the respective outer circumferential surfaces of the first ball nut member 111 and the second ball nut member 112 to be open towards each other, and the supporting member 601 may be inserted and fitted into the insertion grooves 611a and 611b.

The insertion grooves 611a and 611b may be formed long in the outer circumferential surfaces of the first ball nut member 111 and the second ball nut member 112, respectively, and are open towards each other, and the supporting member 601 is inserted over the insertion grooves 611a and 611b of the first ball nut member 111 and the second ball nut member 112.

Although an embodiment in which the supporting member 601 and the insertion holes 611a and 611b are provided only on one side is illustrated in the drawings, two or more may be provided along the circumferential direction to enhance stability.

The supporting member 601 may be slidably coupled to at least one of the insertion grooves 611a and 611b in the axial direction, allowing for relative motion of the first ball nut member 111 and the second ball nut member 112 in the axial direction.

In other words, the supporting member 601 may be coupled to only one of the insertion grooves 611a and 611b to be slidable in the axial direction while being fitted (e.g., press-fitted) into the other to be fastened in the axial direction.

The insertion groove 611a or 611b may be formed in only one of the first ball nut member 111 and the second ball nut member 112, and the supporting member 601 may be integrally formed with the other to be slidably coupled to one of the insertion grooves 611a and 611b in the axial direction.

The supporting member 601 may be fitted into the insertion grooves 611a and 611b, with its top surface protruding beyond the outer circumferential surface of the first ball nut member 111 or the second ball nut member 112. The protruding portion of the supporting member 601 may be engaged with the nut pulley 140, the first inner ring 122, or the second inner ring 123.

Referring to FIGS. 7 and 9, the supporting member 601 may protrude beyond the outer circumferential surface of the first ball nut member 111 in the diameter direction.

A first slit 711 may be formed in the inner circumferential surface of the nut pulley 140 to allow the protruding portion of the supporting member 601 to be inserted thereto, or a second slit 712 may be formed in the inner circumferential surface of the first inner ring 122 to allow the protruding portion of the supporting member 601 to be inserted thereto, so that the supporting member 601 may be engaged with the nut pulley 140 or the first inner ring 122.

Referring to FIGS. 8 and 9, the supporting member 601 may protrude beyond the outer circumferential surface of the second ball nut member 112 in the diameter direction.

A third slit 801 may be formed in the inner circumferential surface of the second inner ring 123 to allow the protruding portion of the supporting member 601 to be inserted thereto, so that the supporting member 601 may be engaged with the second inner ring 123.

Conventionally, the ball nut and the nut pulley are rendered to integrally rotate by being coupled via, e.g., serrations. According to an embodiment, the supporting member 601 is inserted to the insertion grooves 611a and 611b and the first slit 711, allowing the ball nut 110 and the nut pulley 140 to be simply fastened in the circumferential direction without the need for forming, e.g., serrations.

As described above, the first inner ring 122 and the second inner ring 123 are coupled to be slidable on the outer circumferential surfaces of the first ball nut member 111 and the second ball nut member 112, respectively. As the supporting member 601 is inserted into the insertion grooves 611a and 611b and the second slit 712 or the third slit 801, the first ball nut member 111 and the first inner ring 122 may be fastened in the circumferential direction, or the second ball nut member 112 and the second inner ring 123 may be fastened in the circumferential direction, thereby enhancing stability.

Referring to FIGS. 10 and 11, insertion holes 1011a and 1011b may be formed in the opposite surfaces of the first ball nut member 111 and the second ball nut member 112, and supporting members 1001 may be inserted and coupled into the insertion holes 1011a and 1011b.

Although an embodiment in which there are provided three supporting members 1001 and three insertion holes 1011a and 1011b along the circumferential direction of the ball nut 110 is illustrated in the drawings, more or less supporting members and insertion holes may be provided.

Likewise, the supporting member 1001 may be slidably coupled to at least one of the insertion holes 1011a and 1011b in the axial direction, allowing for relative motion of the first ball nut member 111 and the second ball nut member 112 in the axial direction.

In other words, the supporting member 1001 may be coupled to only one of the insertion holes 1011a and 1011b to be slidable in the axial direction while being fitted (e.g., press-fitted) into the other to be fastened in the axial direction.

The insertion holes 1011a or 1011b may be formed in only one of the first ball nut member 111 and the second ball nut member 112, and the supporting members 1001 may be integrally formed with the other to be slidably coupled to the insertion holes 1011a and 1011b in the axial direction.

The steering device of the vehicle, shaped as described above, may mitigate noise by compensating for the clearance inside the bearing supporting the rotation of the ball nut and the clearance between the ball nut and the ball screw and prevent excessive friction between the ball nut and the ball screw and inside the bearing to thereby allow the driver a better steering feel.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A steering device of a vehicle, comprising:
   a ball nut including a first ball nut member and a second ball nut member an inner circumferential surface of each of which is coupled with a ball screw via a first ball, a nut pulley coupled to an outer circumferential surface of the first ball nut member, and a step jaw protruding from an outer circumferential surface of the second ball nut member;
   a bearing including an inner ring including a first inner ring coupled to the outer circumferential surface of the first ball nut member and a second inner ring coupled to the outer circumferential surface of the second ball nut member and provided between the nut pulley and the step jaw, an outer ring coupled to a housing, a second ball provided between the first inner ring and the outer ring, and a third ball provided between the second inner ring and the outer ring;
   a first elastic member provided between the nut pulley and the first inner ring; and
   a second elastic member provided between the step jaw and the second inner ring.

2. The steering device of claim 1, wherein an annular insertion member is provided between the second elastic member and the step jaw.

3. The steering device of claim 1, wherein a first locking portion supported on the second ball protrudes from a nut pulley-side end of an outer circumferential surface of the first inner ring, and wherein a second locking portion supported on the third ball protrudes from a step jaw-side end of an outer circumferential surface of the second inner ring.

4. The steering device of claim 1, wherein a third locking portion supported on the second ball and the third ball protrudes from an inner circumferential surface of the outer ring.

5. The steering device of claim 1, wherein the first inner ring and the second inner ring are spaced apart from each other.

6. The steering device of claim 1, wherein the first ball nut member and the second ball nut member are spaced apart from each other.

7. The steering device of claim 1, wherein a coupling member supporting the nut pulley towards the first inner ring is coupled to the first ball nut member.

8. The steering device of claim 7, wherein the coupling member includes a small diameter portion coupled to an inner circumferential surface of the first ball nut member and a large diameter portion axially supported on the nut pulley.

9. The steering device of claim 8, wherein a protrusion is formed on an inner circumferential surface of the nut pulley, and wherein the protrusion is provided between the large diameter portion and an end of the first ball nut member.

10. The steering device of claim 8, wherein a step portion is formed on an inner circumferential surface of the nut pulley by an increased diameter of the nut pulley, and wherein the large diameter portion is axially supported on the step portion and an end of the first ball nut member.

11. The steering device of claim 1, further comprising a supporting member supported on the first ball nut member and the second ball nut member in a circumferential direction.

12. The steering device of claim 11, wherein the supporting member is coupled to at least one of the first ball nut member or the second ball nut member to be axially slidable.

13. The steering device of claim 12, wherein the supporting member is coupled to one of the first ball nut member and the second ball nut member to be axially slidable and integrally formed with the other.

14. The steering device of claim 11, wherein insertion grooves are formed in outer circumferential surfaces of the first ball nut member and the second ball nut member to be open towards each other, and wherein the supporting member is inserted and coupled into the insertion grooves.

15. The steering device of claim 14, wherein the supporting member protrudes beyond the outer circumferential surface of the first ball nut member in a diameter direction.

16. The steering device of claim 15, wherein a first slit, into which a portion of the supporting member which protrudes in the diameter direction is inserted, is axially formed in an inner circumferential surface of the nut pulley.

17. The steering device of claim 15, wherein a second slit, into which a portion of the supporting member which protrudes in the diameter direction is inserted, is axially formed in an inner circumferential surface of the first inner ring.

18. The steering device of claim 14, wherein the supporting member protrudes beyond the outer circumferential surface of the second ball nut member in a diameter direction.

19. The steering device of claim 18, wherein a third slit, into which a portion of the supporting member which protrudes in the diameter direction is inserted, is axially formed in an inner circumferential surface of the second inner ring.

20. The steering device of claim 11, wherein insertion holes are formed in opposite surfaces of the first ball nut member and the second ball nut member, and wherein the supporting member is inserted and coupled into the insertion holes.

* * * * *